United States Patent [19]
Naganawa

[11] Patent Number: 5,014,165
[45] Date of Patent: May 7, 1991

[54] GLASS-MADE LENS

[75] Inventor: Masahito Naganawa, Shizuoka, Japan

[73] Assignee: Koito Manufacturing Co., Ltd., Shizuoka, Japan

[21] Appl. No.: 450,889

[22] Filed: Dec. 14, 1989

[30] Foreign Application Priority Data

Dec. 22, 1988 [JP] Japan ............................ 63-321983

[51] Int. Cl.[5] ........................ B60Q 1/00; F21V 7/00

[52] U.S. Cl. .................................. 362/61; 362/309; 362/335; 350/431

[58] Field of Search ................ 362/61, 80, 309, 311, 362/332, 335, 296, 297, 308, 299; 350/237, 482, 431

[56] References Cited

U.S. PATENT DOCUMENTS 4,329,738 5/1982 Heinz et al. ........................ 362/61
4,446,511 5/1984 Sands ................................ 362/80
4,608,623 8/1986 Stephano ............................ 362/80
4,701,834 10/1987 Glaser et al. ...................... 362/307
4,831,502 5/1989 Fujino et al. ...................... 362/61
4,839,785 6/1989 Ohishi .............................. 362/418
4,895,693 1/1990 Suzuki et al. ...................... 362/61
4,931,912 6/1990 Kawakami et al. ................. 362/61

FOREIGN PATENT DOCUMENTS 479680 2/1938 United Kingdom ............... 362/335

*Primary Examiner*—Stephen F. Husar
*Assistant Examiner*—D. M. Cox
*Attorney, Agent, or Firm*—Sughrue, Mion, Zinn, Macpeak & Seas

[57] ABSTRACT

A glass-made lens of the kind having a front surface portion and a peripheral wall portion integrally formed with the front surface portion and projecting in the rear direction from the circumference of the front surface portion. The front surface portion is formed to have a curved surface portion and is formed into a twisted form.

6 Claims, 7 Drawing Sheets

GLASS-MADE LENS

FIELD OF THE INVENTION

The present invention relates to a novel glass-made lens and, particularly to a glass-made lens having a front surface portion and a peripheral portion being integrally fromed wih the front surface portion.

DESCRIPTION OF PRIOR ART

A glass-made lens is conventionally used in a headlight of an automobile, and recently it is required to reduce the thickness of the glass for reducing the weight and to increase the dimensions or the size of the lens.

When the thickness of the glass is reduced the strength of the lens reduces correspondingly, and when the dimension of the lens increases the strength of the lens also reduces correspondingly.

The present invention aims to solve the above described problems and to provide a novel glass-made lens.

SUMMARY OF THE INVENTION

According to the invention, there is provided a glass-made lens of the kind having a front surface portion and a peripheral wall portion integrally formed with the front surface portion and projecting in the rear direction from the circumference of the front surface portion, in which the front surface portion is formed to have a curved surface portion and is formed into a twisted form.

According to the invention, it is possible to increase the mechanical strength of the front surface portion and to compensate the decrease in the strength due to the thin thickness and to the increased size.

BRIEF DESCRIPTION OF THE DRAWINGS

Further objects and effects of the invention will become apparent from the following detailed description in conjunction with the drawings which exemplify a preferred embodiment of the present invention, in which.

DETAILED DESCRIPTION OF PREFERRED EMBODIMENTS

Figure 1:
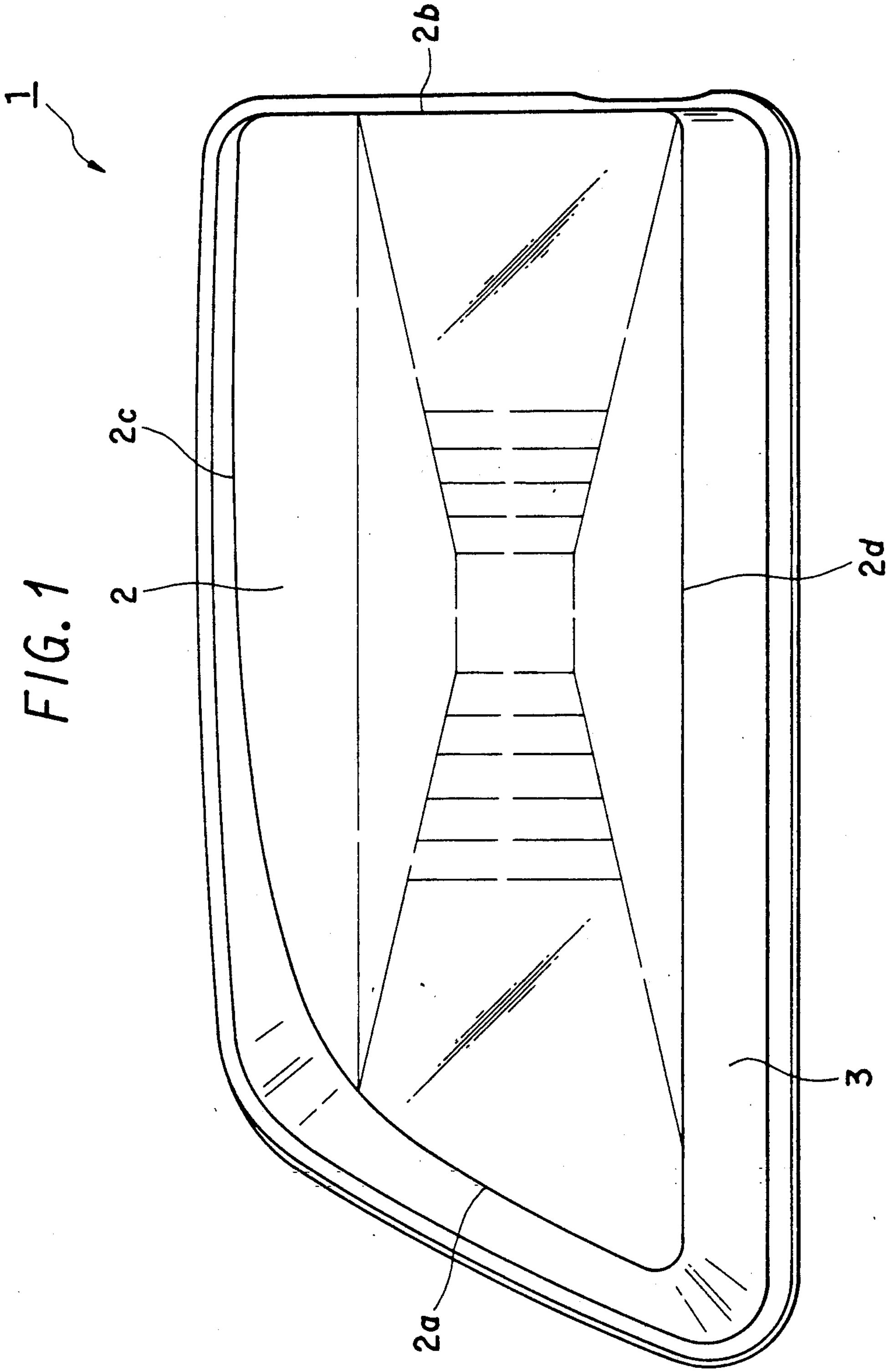
FIG. 1 is a front view.
Figure 2:
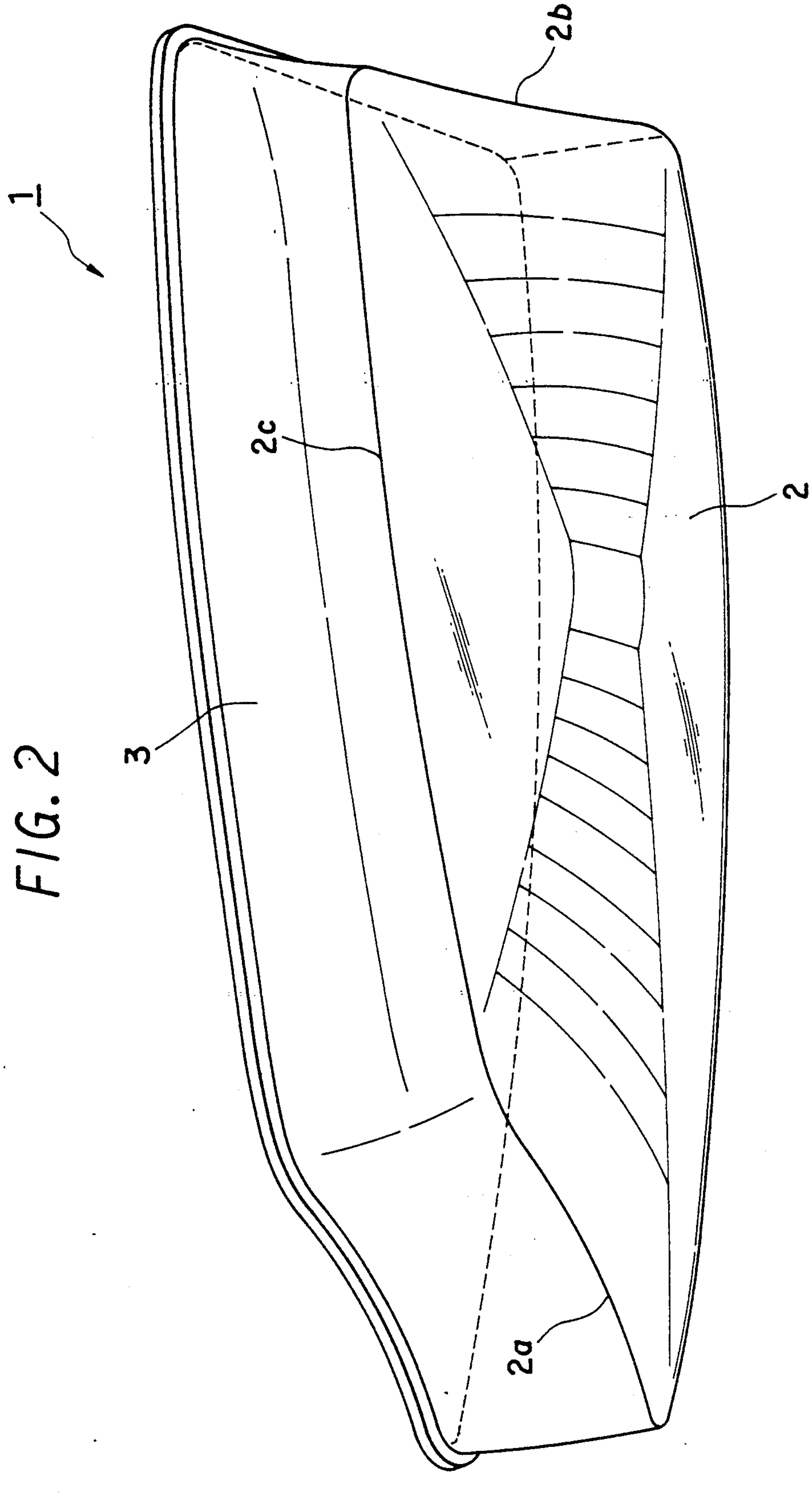
FIG. 2 is a plan view.
Figure 3:
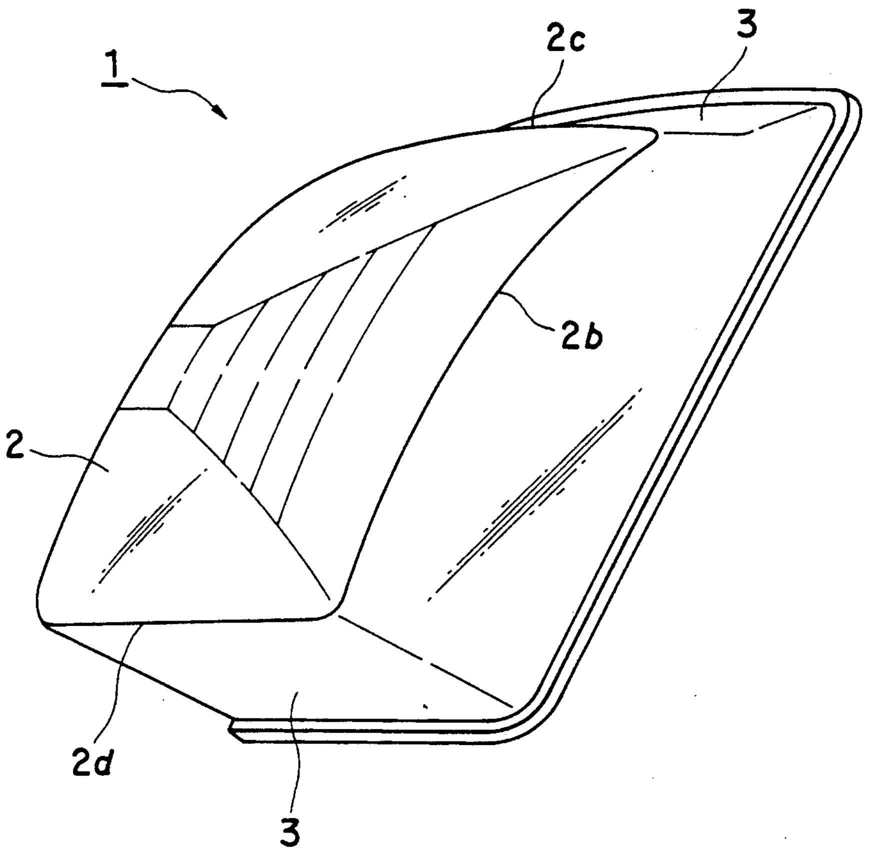
FIG. 3 is a right side view.
Figure 4:
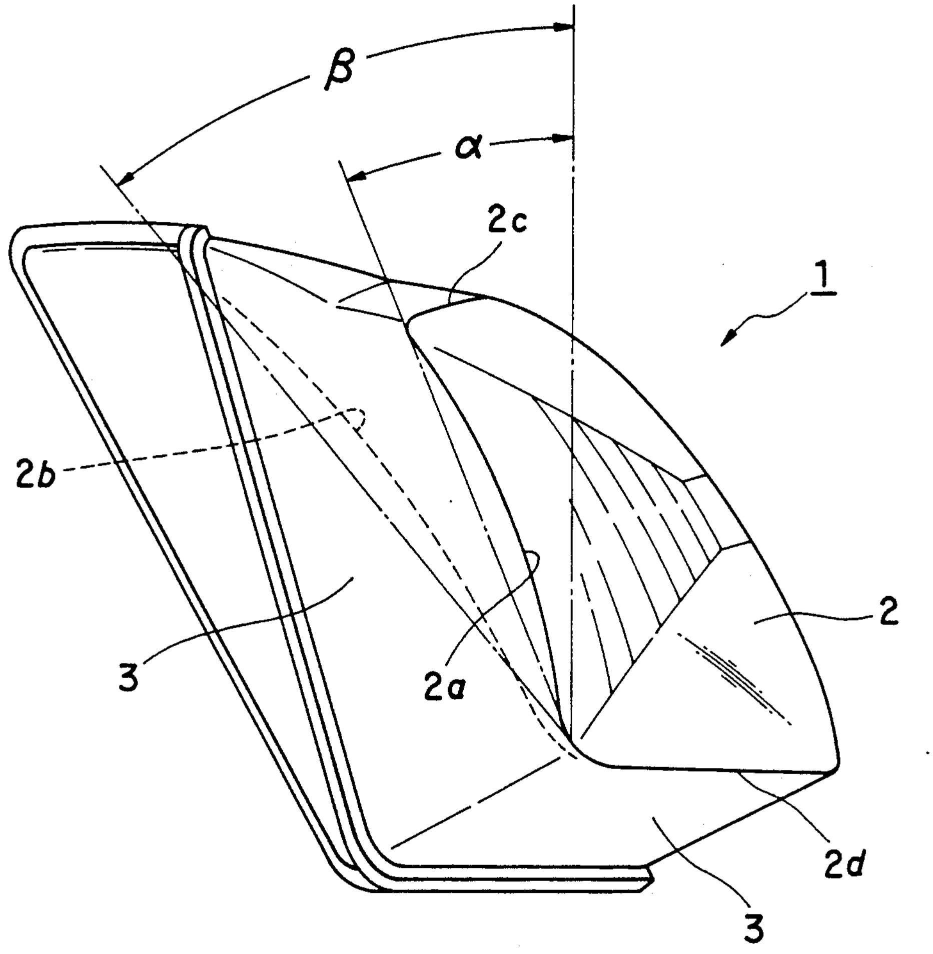
FIG. 4 is a left side view.

FIG. 1 through FIG. 7 show a preferred embodiment of the present invention, wherein shown at numeral 1 is glass-made lens which is formed by die forming process of a glass.

The lens 1 consists of a front surface portion 2 facing generally in the front direction and a peripheral wall portion 3 being formed integrally with the front surface portion 2 and projecting generally in the rear direction from the periphery of the front surface portion 2.

The front surface portion 2 of the lens 1 has curved portions in up and down direction and in left and right direction, and further has twisted portions. Namely, in left and right direction, from one side end 2*a* to the other side end 2*b*, the front surface portion 2 is inclined in rear direction and is slightly convex in the front direction, and in up and down direction and from the upper end 2*c* to the lower end 2*d*, the front surface portion 2 is inclined in the front direction and is slightly convex in the front direction. Further, the angle of inclination $\alpha$ in the rear direction at the one end 2*a* is smaller than the angle of inclination $\beta$ in the rear direction at the other end 2*b*, so that the surface portion 2 is deemed to be twisted.

Shown at numeral 4 is a lamp body which defines a recess 5 opening in the front direction. A groove 6 is formed in the periphery of the front opening of the lamp body 4. The rear end of the peripheral wall portion 3 of the lens 1 is fitted in the groove 6 and is secured to the lamp body 4 by bonding agent 7.

A reflective mirror 8 is tiltably mounted in the recess 5 of the lamp body 4, and an electric bulb 9 is detachably mounted on the reflective mirror 8.

Shown at 10 is a pivotal supporting portion between the reflective mirror and the lamp body 4 provided at an upper right position as viewed from the front side, and comprises a support shaft 11 mounted on the lamp body 4 and having a spherical portion 11*a* on the front end and a receptacle member 12 mounted on the reflective mirror 8 and having a spherical recess 12*a*. The recess 12*a* is adapted to receive the spherical portion 11*a* pivotally.

Shown at 13 is an aiming adjusting portion provided at a lower right position as viewed from the front side, and comprises an adjust shaft 14 rotatively supported on the lamp body 4 and having a screw-thread portion 14*a* on the front portion, a nut 15 mounted on the reflective mirror 8 and being adapted to engage screw-threadingly with the screw-thread portion 14*a* of the adjust shaft 14, an actuating shaft 16 and a gear unit 17 which transmits the rotation of the actuating shaft 16 to the adjust shaft 14. In response to the direction of the rotation of the actuating shaft 16 the adjust shaft 14 is threaded into or out of the nut 15, and the nut 15 displaces in rear or front direcion relative to the adjust shaft 15.

Another aiming adjusting portion 13' is provided at an upper left position as viewed from the front side, and the construction is similar to that of the adjusting portion 13. It will be understood that when the aiming adjusting portion 13 is adjusted the reflective mirror 8 tilts relative to the lamp body 4 around a straight line connecting the aiming adjusting portion 13' with the pivotal supporting portion 10.

Figure 5:
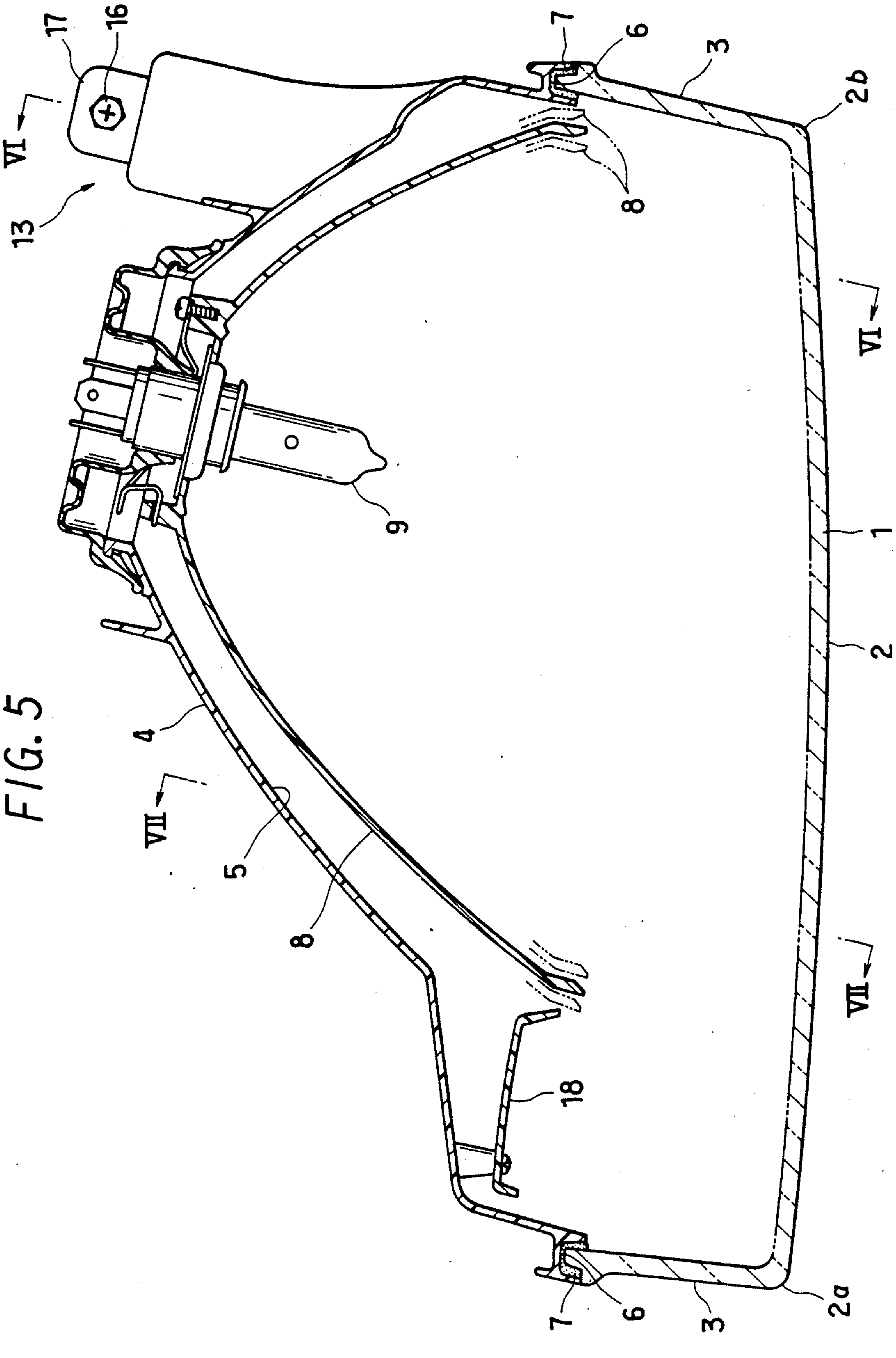
FIG. 5 is a horizontal section view.
Figure 6:
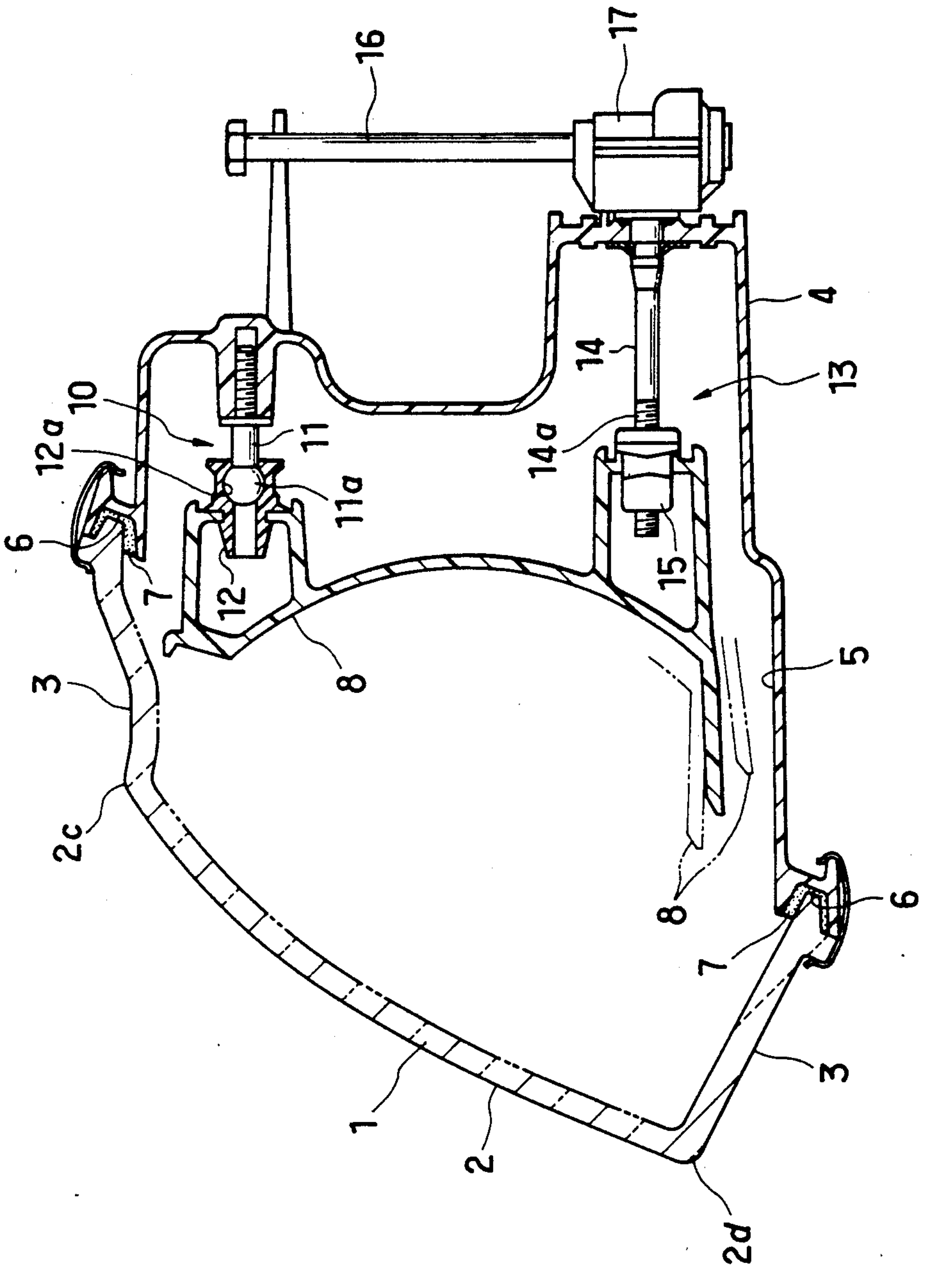
FIG. 6 is a cross-sectional view taken generally along line VI—VI in FIG. 5.
Figure 7:
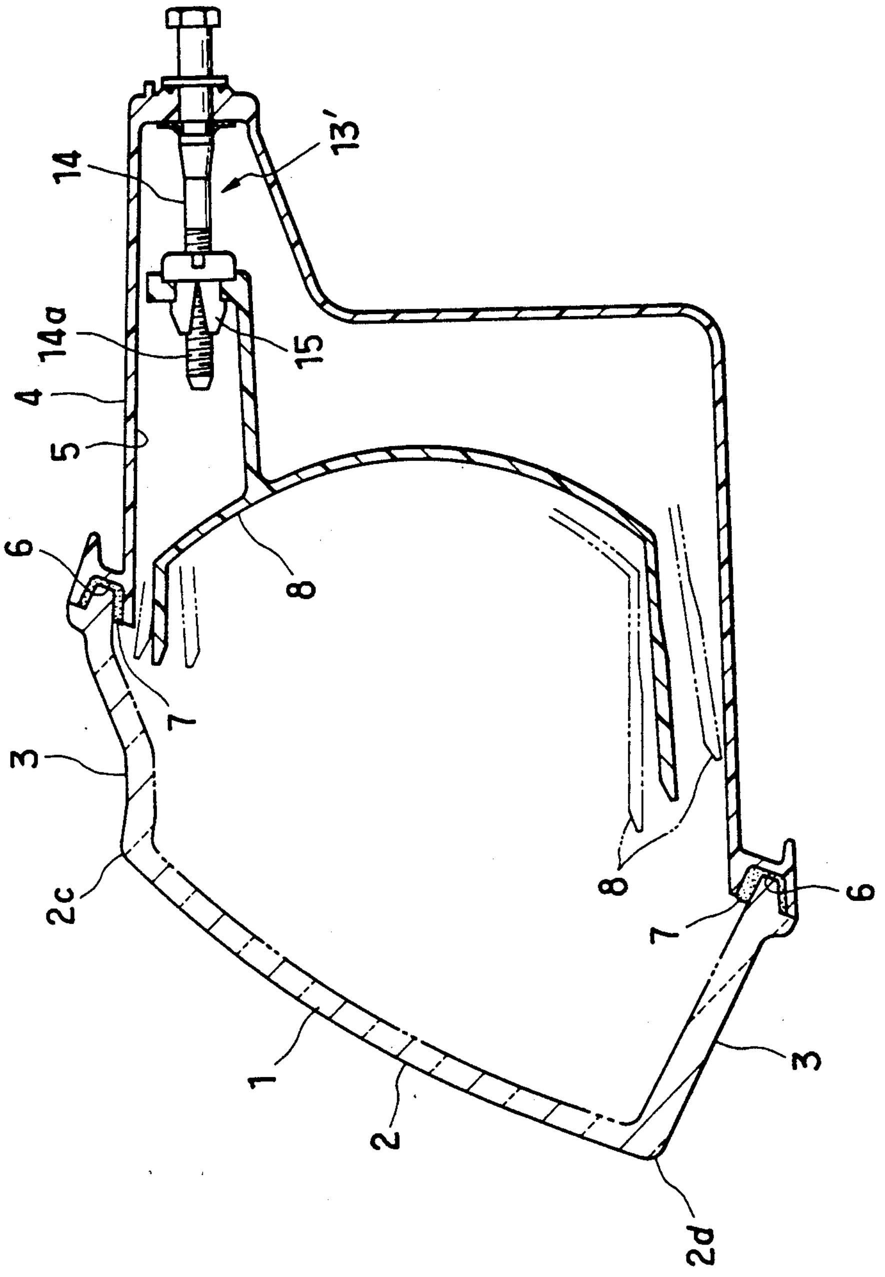
FIG. 7 is a cross-sectional view taken generally along line VII—VII in FIG. 5.

Shown at 18 are reflector plates (only one is shown in FIG. 5) which are mounted on one side of the reflective mirror 8. In response to the recent design of horizontally elongated configuration of the headlight, the size of the lens is extended horizontally, but it is difficult to extend the reflective mirror. The plates 18 act to fill the gap between the reflective mirror 8 and the lens 2 and to improve the appearance.

ADVANTAGES OF THE INVENTION

As described above, according to the invention, the front surface portion of the glass-made lens is formed to have a curved surface portion and is formed into a twisted form, thus, it is possible to increase the mechanical strength of the front surface portion and to compensate the decrease in the strength due to the thin thickness and to the increased size.

Further, the lens according to the invention is adapted for use in an automobile headlight having a reduced vertical size, an elongated horizontal size and forward and downward inclined front surface configuration corresponding to modern design of a sports car and the like, which enables to improve substantially the aerodynamic characteristics of the vehicle.

It will be understood that the foregoing disclosure and description of the invention are illustrative and explanatory thereof. Various changes and modifications in the size, shape and materials, as well as the details of the illustrated construction, may easily be made for those skilled in the art within the scope of the claims without departing from the spirit of the present invention.

What is claimed is:

1. In a glass lens comprising a front portion, and a side wall portion formed integrally with said front portion, said side portion projecting rearwardly from the circumference of said front portion, the improvement wherein said front is curved, and a top edge of said front portion is offset rearwardly with respect to a bottom edge of said front portion so that a top part of said front portion slopes rearwardly with respect to a bottom part of said front portion, angle of inclination along one lateral edge of said front portion with respect to a vertical line being smaller than an angle of inclination along the opposing lateral edge of said front portion such that said front portion is twisted.

2. The glass lens of claim 1, wherein said front portion curves forwardly in a vertical plane so as to be slightly convex in said vertical plane.

3. The glass lens of claim 1, wherein said front portion curves forwardly in a horizontal plane so as to be slightly convex in said horizontal plane.

4. An automobile headlight comprising:

a headlight body, a reflective surface being formed on an inner surface of said headlight body;

a light source positioned within said headlight body; and a glass lens disposed over an open forward end of said headlight body, said glass comprising a front portion and a side wall portion formed integrally with said front portion, said side portion projecting rearwardly from the circumference of said front portion, said front portion being curved, and a top edge of said front portion being offset rearwardly with respect to a bottom edge of said front portion so that a top part of said front portion slopes rearwardly with respect to a bottom part of said front portion, an angle of inclination along one lateral edge of said front portion with respect to a vertical line being smaller than an angle of inclination along the opposing lateral edge of said front portion such that said front portion is twisted.

5. The automobile headlight of claim 4, wherein said front portion curves forwardly in a vertical plane so as to be slightly convex in said vertical plane.

6. The automobile headlight of claim 4, wherein said front portion curves forwardly in a horizontal plane so as to be slightly convex in said horizontal plane.

* * * * *